US012766947B2

(12) United States Patent
Cretin

(10) Patent No.: US 12,766,947 B2
(45) Date of Patent: Oct. 20, 2026

(54) VEHICULAR CHARGE PORT OR FUEL FILL CLOSURE SYSTEM WITH ACTUATOR AND INTEGRATED LOCK

(71) Applicant: Magna Mirrors Holding GmbH, Sailauf (DE)

(72) Inventor: Jean-Dominique Cretin, Sant Cugat del Valles (ES)

(73) Assignee: Magna Mirrors Holding GmbH, Sailauf (DE)

( * ) Notice: Subject to any disclaimer, the term of this patent is extended or adjusted under 35 U.S.C. 154(b) by 463 days.

(21) Appl. No.: 18/476,362

(22) Filed: Sep. 28, 2023

(65) Prior Publication Data

US 2024/0109409 A1 Apr. 4, 2024

Related U.S. Application Data

(60) Provisional application No. 63/377,537, filed on Sep. 29, 2022.

(51) Int. Cl.
*B60K 15/05* (2006.01)

(52) U.S. Cl.
CPC ...... *B60K 15/05* (2013.01); *B60K 2015/0515* (2013.01); *B60K 2015/0561* (2013.01)

(58) Field of Classification Search
CPC ............ B60K 15/05; B60K 2015/0515; B60K 2015/0561
USPC ........................................................ 296/97.22
See application file for complete search history.

(56) References Cited

U.S. PATENT DOCUMENTS 4,214,683 A 7/1980 Wills et al.
5,401,174 A 3/1995 Hansen
5,478,250 A 12/1995 Hoffman
5,709,561 A 1/1998 Cadoret et al.
5,857,770 A 1/1999 Fohl et al.
5,934,918 A 8/1999 Wuechner
6,371,768 B1 4/2002 Neblett et al.
6,459,234 B2 10/2002 Kajiura
7,258,556 B1 8/2007 Boutros et al.
7,540,641 B2 6/2009 Gardner et al.
7,789,523 B2 9/2010 Arnold, III
7,850,371 B2 12/2010 Riley et al.
8,134,334 B2 3/2012 Suzuki et al.
8,317,376 B2 11/2012 Hook et al.
8,628,225 B2 1/2014 Hook et al.

(Continued)

*Primary Examiner* — Amy R Weisberg
*Assistant Examiner* — Daniel R Digiovannantonio
(74) *Attorney, Agent, or Firm* — HONIGMAN LLP

(57) ABSTRACT

A vehicular closure system includes a cover panel configured to mount at a vehicle. A deployment mechanism is coupled to the cover panel and electrically operable to move the cover panel between a closed position and an opened position. When the cover panel is in the closed position, a detent interface of the vehicular closure system is engaged to prevent the cover panel from being manually moved from the closed position. When the cover panel is in the closed position, and responsive to operation of the deployment mechanism to move the cover panel from the closed position toward the opened position, the detent interface is moved out of engagement to allow for movement of the cover panel from the closed position toward the opened position. With the detent interface moved out of engagement, operation of the deployment mechanism moves the cover panel from the closed position toward the opened position.

30 Claims, 12 Drawing Sheets

(56) References Cited

U.S. PATENT DOCUMENTS

| | | | | |
|---|---|---|---|---|
| 9,156,396 | B2 | 10/2015 | Hook et al. | |
| 9,656,599 | B2 | 5/2017 | Hook et al. | |
| 10,406,970 | B2 | 9/2019 | Hook et al. | |
| 10,557,298 | B2 | 2/2020 | Dillinger et al. | |
| 10,746,575 | B2 | 8/2020 | Kennedy | |
| 2008/0186726 | A1 | 8/2008 | Okada | |
| 2010/0026238 | A1 | 2/2010 | Suzuki et al. | |
| 2010/0045450 | A1 | 2/2010 | Suzuki et al. | |
| 2013/0271079 | A1 | 10/2013 | Tanneberger et al. | |
| 2020/0122570 | A1* | 4/2020 | Sha | E05B 81/06 |
| 2021/0061091 | A1* | 3/2021 | Martin | E05F 15/71 |
| 2021/0129757 | A1 | 5/2021 | Uken | |
| 2021/0281030 | A1 | 9/2021 | Hahn et al. | |
| 2022/0134874 | A1* | 5/2022 | Tanaka | B60K 15/05<br>296/97.22 |
| 2022/0290476 | A1* | 9/2022 | Hegwein | E05B 81/42 |
| 2023/0133911 | A1 | 5/2023 | Ravichandran | |
| 2023/0191926 | A1 | 6/2023 | Cretin | |
| 2023/0241964 | A1* | 8/2023 | Sun | B60L 53/16<br>296/97.22 |
| 2024/0109409 | A1 | 4/2024 | Cretin | |

* cited by examiner

VEHICULAR CHARGE PORT OR FUEL FILL CLOSURE SYSTEM WITH ACTUATOR AND INTEGRATED LOCK

CROSS REFERENCE TO RELATED APPLICATION

The present application claims the filing benefits of U.S. provisional application Ser. No. 63/377,537, filed Sep. 29, 2022, which is hereby incorporated herein by reference in its entirety.

FIELD OF THE INVENTION

The present invention relates to a charge or fuel port of a vehicle, and a closure system for the charge or fuel port with an actuator and an integrated lock.

BACKGROUND OF THE INVENTION

It is known to cover or conceal a fuel port of a vehicle or a charging port of an electric vehicle with a flap or door that is pivotable relative to the port between a closed position, where the flap is disposed over the port to cover and conceal the port, and an opened position, where the flap is pivoted away from the port to expose the port for receiving a fuel source or electrical connector of a charging station. The flap is typically located on the side of the vehicle and is manually pivotable between the closed and opened positions. Traditionally, the flap is locked (i.e., the flap cannot be manually pivoted from the closed position to the opened position) and unlocked (i.e., the flap can be manually pivoted) via the vehicle's central locking system for locking and unlocking the doors of the vehicle.

SUMMARY OF THE INVENTION

A vehicular closure system for a charge or fuel port cover panel includes a cover panel and a deployment mechanism. The cover panel is disposed at a vehicle equipped with the vehicular closure system and movable between (i) a closed position, where the cover panel conceals a charge or fuel port of the vehicle, and (ii) an opened position, where the cover panel is moved away from the vehicle to allow access to the charge or fuel port. The deployment mechanism is coupled to the cover panel and electrically operable to move the cover panel between the closed position and the opened position. When the cover panel is in the closed position, a detent interface of the vehicular closure system is engaged to prevent the cover panel from being manually moved from the closed position. When the cover panel is in the closed position, the deployment mechanism is electrically operable to move the detent interface out of engagement to allow for movement of the cover panel from the closed position toward the opened position. With the detent interface moved out of engagement, the deployment mechanism is further electrically operable to move the cover panel to the opened position.

The detent interface may be formed between a displaceably arranged latch and a main shaft or pivot arm of the cover panel.

A coupling may be provided between a drive shaft of the deployment mechanism and the main shaft or pivot arm of the cover panel. During operation of the deployment mechanism to move the cover panel between the closed position and the opened position, the drive shaft is driven and rotates a threshold amount relative to the main shaft. The threshold amount represents an angle of torsional backlash. A rotationally fixed connection coupling rotation of the drive shaft to the main shaft occurs only after the threshold amount of rotation or torsional backlash. The latching engagement between the latch and the main shaft is not released until the drive shaft is rotationally coupled to the main shaft.

With the cover panel in the closed position, the closure system may automatically lock the cover panel so that it cannot be manually moved from the closed position without requiring a locking input from a user. The cover panel may be movable from the closed position only by operation of the deployment mechanism.

A single actuator may perform both functions of locking or securing the cover panel in the closed position and moving the cover panel between the closed position and the opened position. That is, separate actuators for moving the cover panel between the closed position and the opened position and for securing the cover panel in the closed position are not required.

For example, a main pivot shaft or hinge arm is locked or secured when the cover panel is in the closed position to preclude movement of the cover panel from the closed position. An interlock or detent between a latch element of the hinge arm and a lock actuator secures the hinge arm and the cover panel in position.

Benefits of a single actuator closure system include cost improvement, such as cost reduction in bill of materials costs, assembly, and maintenance. There may also be fewer issues when mounting the closure system and cover panel at the vehicle.

The charging port or fuel port may be illuminated by any suitable means. Further, the vehicle may include indicators, such as visual indicators, to show the state of charging of the vehicle.

These and other objects, advantages, purposes and features of the present invention will become apparent upon review of the following specification in conjunction with the drawings.

BRIEF DESCRIPTION OF THE DRAWINGS

FIGS. 9A-11C are perspective views of the closure system as the fuel port cover panel moves from the closed position toward the opened position;

DESCRIPTION OF THE PREFERRED EMBODIMENTS

Figures 1, 1A:
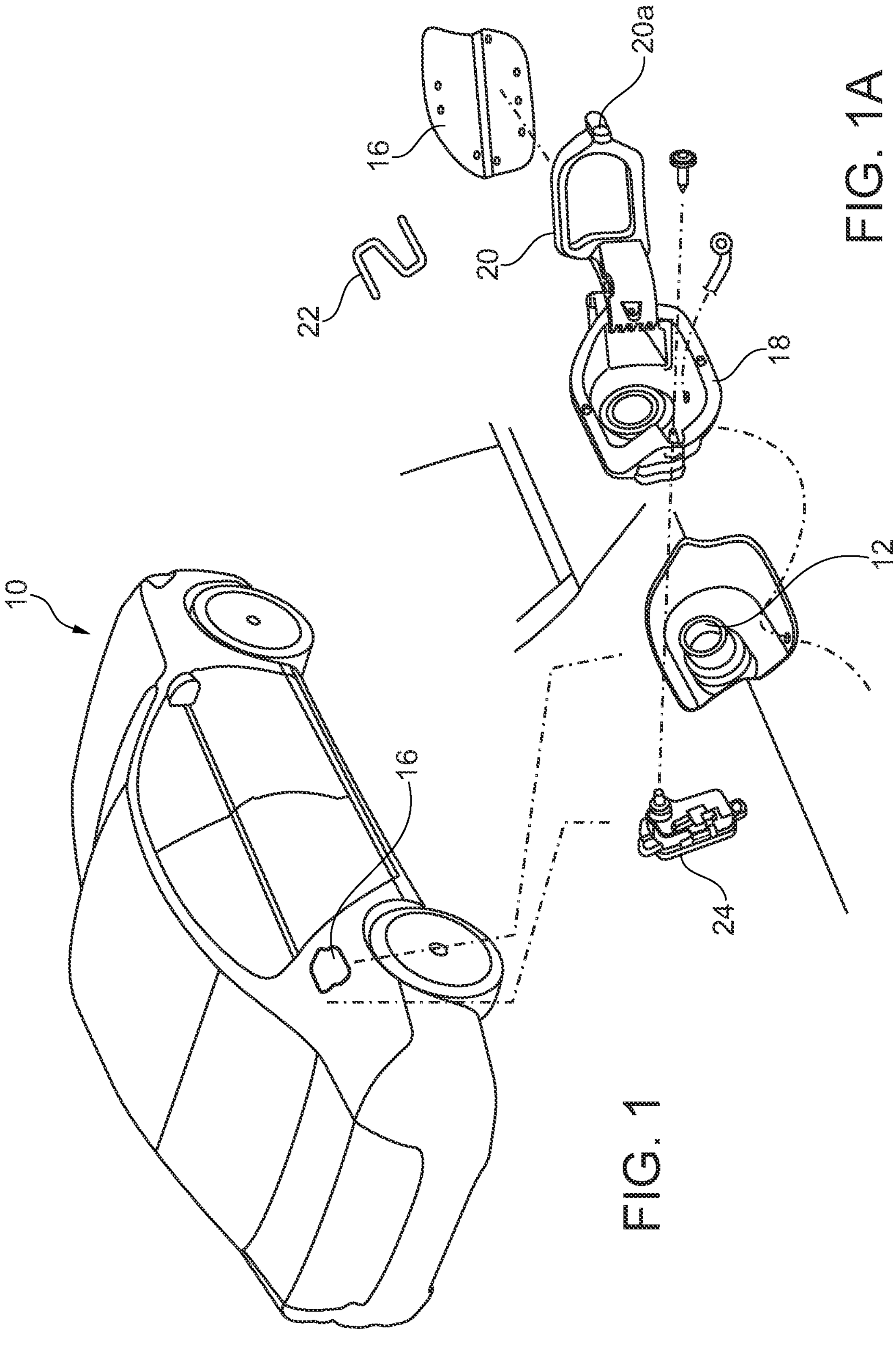
FIG. 1 is a perspective view of a vehicle with a manual closure system with a locking actuator for a fuel port cover panel of the vehicle.
FIG. 1A is an exploded view of the closure system of FIG. 1.

Referring now to the drawings and the illustrative embodiments depicted therein, a vehicle 10 includes a fuel filler port or opening 12 configured to receive a nozzle that delivers fuel (e.g., gasoline) to a fuel tank of the vehicle via the fuel port 12 for powering a drive system of the vehicle 10 (FIG. 1). Optionally, the vehicle 10 may be an electrically powered vehicle or a plug-in hybrid vehicle with a charging port or receiver or socket 12 configured to receive a charging connector that delivers electricity to charge a battery system of the vehicle 10. The vehicle 10 includes a closure system or assembly 14 that includes a flap or door 16 disposed over the fuel or charging port 12 to, for example, conceal the port 12 and preclude contaminants such as moisture or dirt from entering the port 12. The flap 16 is pivotably disposed at the port 12 and is movable between a closed position, where the flap 16 is disposed over the port 12, and an opened position, where the flap 16 is moved away from the vehicle and the port 12 to provide access to the port 12. In the illustrated example, the closure system 14 includes a bracket or housing or base portion 18 attached at the vehicle 10 at or near or surrounding the port 12, and the flap 16 is pivotally attached to the bracket 18.

As shown in FIG. 1, the port 12 is disposed along a side of the vehicle 10 and, when the flap 16 is in the closed position, the exterior surface of the flap 16 is substantially flush with and corresponds to the exterior surface of the vehicle 10 at or surrounding the port 12. The port 12 and closure system 14 may be disposed at any suitable position at the exterior of the vehicle. For example, the port 12 may be disposed at the front or rear fender or bumper of the vehicle. Optionally, the port 12 may be concealed behind an exterior feature of the vehicle 10, such as a manufacturers emblem, a portion of a headlight or taillight, a license plate bracket, or the like, where the closure system 14 enables movement of the exterior feature between the closed and opened positions.

In the illustrated example of FIGS. 1 and 1A, the flap 16 is pivotally attached at the bracket 18 via a hinge arm 20 that pivots relative to the bracket 18, such as via a hinge connecting the hinge arm 20 to the bracket 18, to move the flap 16 between the closed and opened positions. The hinge arm 20 pivots about a pivot axis to move the flap 16 in any suitable direction toward and away from the port and between the closed position and the opened position. For example, the hinge arm 20 may pivot about a vertical pivot axis to move the flap 16 outward from the side of the vehicle, or a horizontal pivot axis to move the flap 16 upward or downward from the side of the vehicle.

The hinge arm 20 includes a latch element **20*a* that engages a portion of the bracket 18 when the flap is in the closed position to secure the flap 16 in the closed position, such as to prevent the flap from unintentionally opening while the vehicle is moving. The latch element 20*a* may be connected to or coupled to or comprise a part of a lock actuator 24 that is operable to lock the flap 16 in the closed position (i.e., the flap cannot be manually moved from the opened position) and electrically operable to release or unlock the latch element 20*a* so that the flap 16 may be manually moved to the opened position. For example, the lock actuator 24 may lock the flap 16 in the closed position when the vehicle doors are locked and the lock actuator 24 may unlock or release the flap 16 when the vehicle doors are unlocked. When the vehicle doors are unlocked and the flap 16 is in the closed position, the latch element 20*a* may releasably engage a portion of the bracket 18 to secure the flap 16 in the closed position and remain manually movable to the opened position. The lock actuator 24 may comprise any suitable fastening device, such as a mechanical latching mechanism that engages the latch element 20*a* or an electromagnetic latching mechanism that is electrically operable to magnetically retain and release the latch element 20*a***.

Optionally, a biasing element, such as a spring element 22, may be disposed at the closure system 14 and bias the flap 16 from the closed position toward the opened position so that, when the lock actuator 24 releases or unlocks the flap 16, the biasing force of the spring element 22 moves the flap 16 from the closed position toward the opened position, such as to make the flap 16 graspable by a user and manually movable to the opened position. That is, the biasing element 22 may move or urge the flap 16 partially toward the opened position when the flap 16 is unlocked so that the user may manually move the flap 16 the rest of the way from the partially opened position to the fully opened position. When the flap 16 is moved from the opened position to the closed position, the latch element **20*a* may reengage the portion of the bracket 18 to secure the flap 16 in the closed position. Thus, the closure system 14 provides a manually movable flap 16 that may be locked in the closed position via the lock actuator 24 and, responsive to an unlock signal or input (such as an unlock signal from a user's keyfob to unlock the doors of the vehicle), the lock actuator 24 releases the flap 16** to be manually moved between the closed and opened positions.

In other words, a locking actuator is included on the fuel filler flap. The fuel filler flap remains unlocked until the vehicle is locked with the remote control keyfob button for locking the vehicle doors. The fuel filler flap is unlocked with the remote keyfob button for unlocking the vehicle doors. The locking actuator protects from unauthorized access to the fuel port and fuel in the tank of the vehicle.

Figure 2:
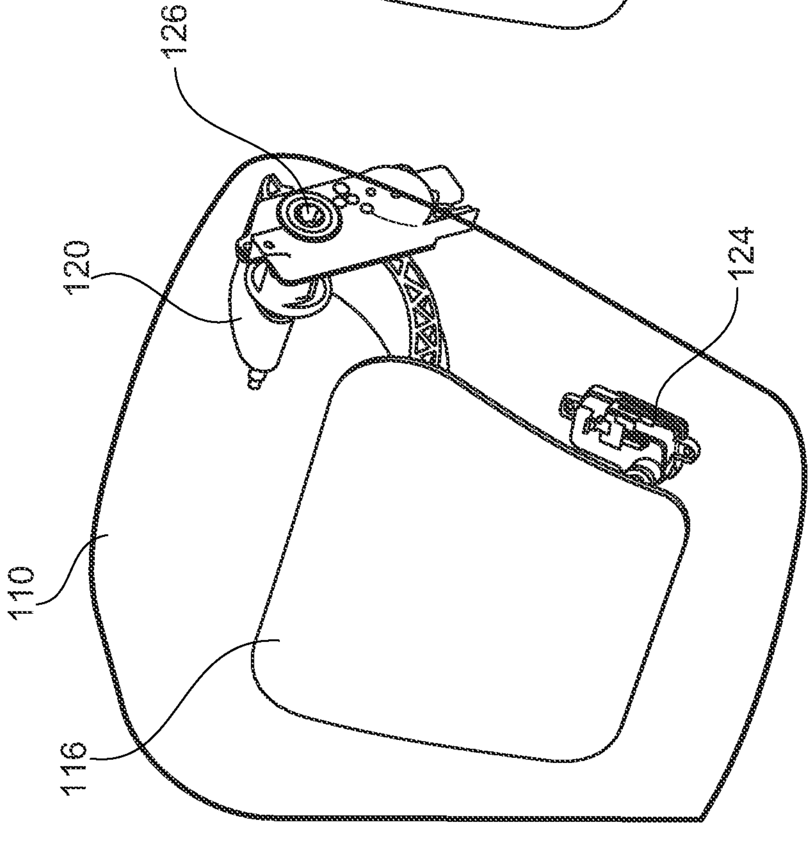
FIGS. 2 and 3 are perspective views of another closure system having a locking actuator and a separate power movement actuator.
Figure 3:
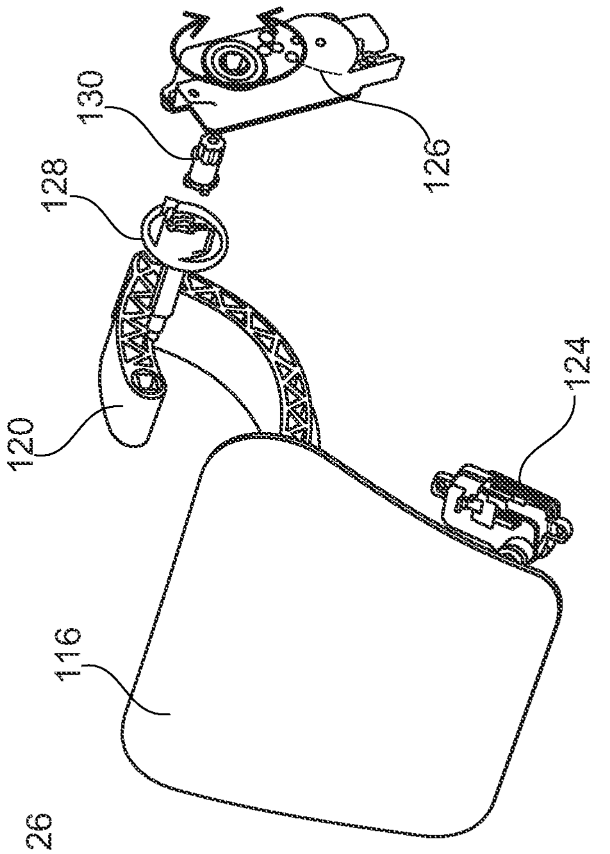

As shown in FIGS. 2 and 3, in some implementations, a closure system 114 includes the lock actuator 124 to lock and release the flap 116 and a second, power movement actuator 126 for moving the flap 116 between the closed and opened positions relative to the charge port at the side of the vehicle 110. The lock actuator 124 and the power movement actuator 126 are separately coupled to the flap 116. The power movement actuator 126 is coupled to the hinge arm 120 and includes a motor that is electrically operable to pivot the hinge arm 120 about the pivot axis to move the flap 116 between the closed and opened positions. In the illustrated example, a pivot pin or shaft 128 is pivotable by the power movement actuator 126 and fixedly attached to the hinge arm 120. When the power movement actuator 126 is electrically operated to move the flap 116, the power movement actuator 126 rotates the pivot shaft 128, which in turn moves the flap 116. The power movement actuator 126 may drive a driving shaft 130 that in turn causes rotation of the pivot shaft 128. The power movement actuator 126 may be operable responsive to a user input, such as from the user keyfob or from a user actuatable input inside the cabin of the vehicle. The power movement actuator 126 may be installed at an electric vehicle, such as to move the flap 116 away from the charging port and to adjust positioning of the charging port relative to the side of the vehicle 110 to a more accessible position, such as by utilizing aspects of the charging ports described in U.S. Publication No. US 2023/0191926, which is hereby incorporated herein by reference in its entirety.

In other words, for electric vehicles, a second actuator may be installed on the flap. The second actuator's function is the assisted opening and closing of the flap, and therefore, some vehicles may include two actuators at the charging flap. However, disadvantages of two actuators include cost issues (such as bill of materials cost, assembly, and maintenance) and the protuberance generated by the locking actuator 124 can generate an assembly issue when mounting the closure system at the vehicle.

Figure 5:
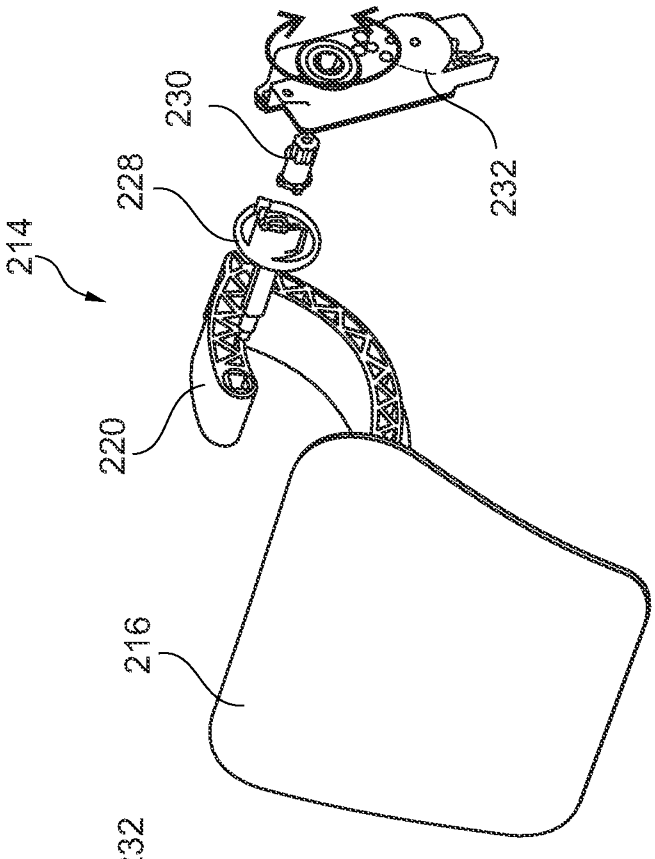
FIGS. 4 and 5 are perspective views of another closure system having an automatic locking power movement actuator.
Figure 4:
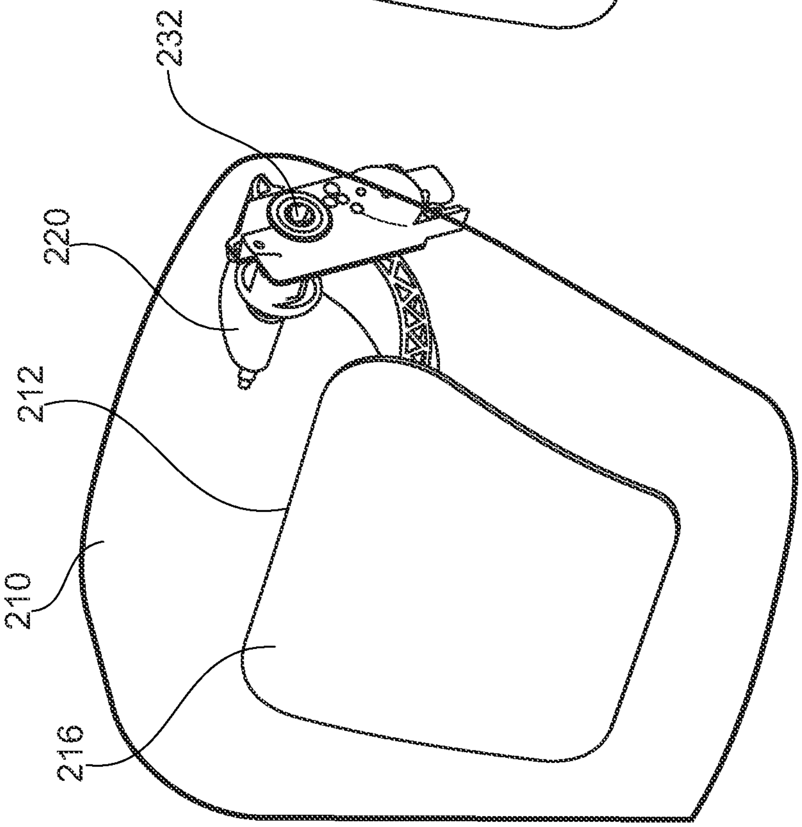
Figure 7:
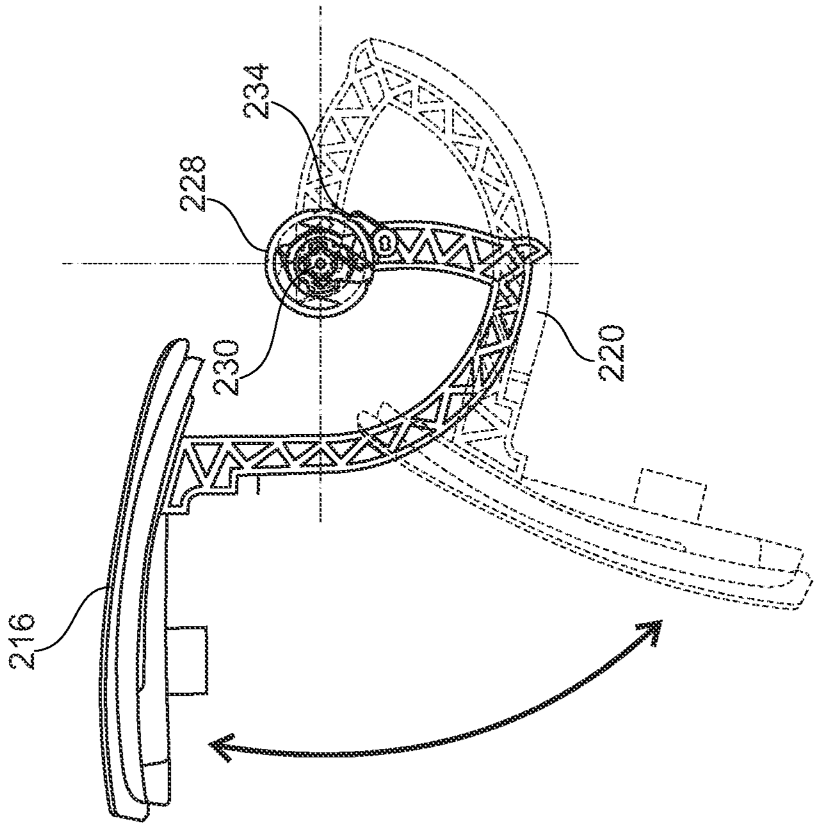
FIGS. 6 and 7 are side views of the closure system of FIGS. 4 and 5, showing movement of the fuel port cover panel between the closed and opened positions.
Figure 6:
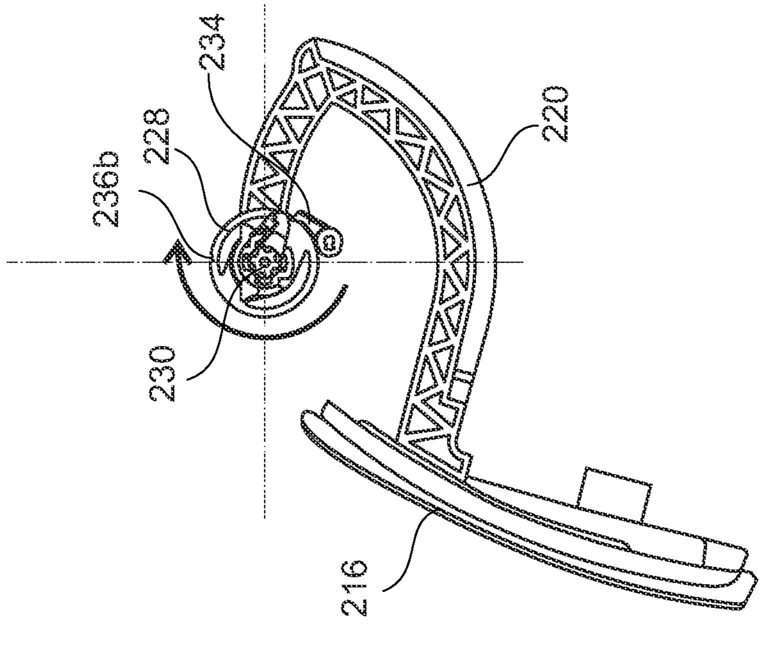
Figure 8A:
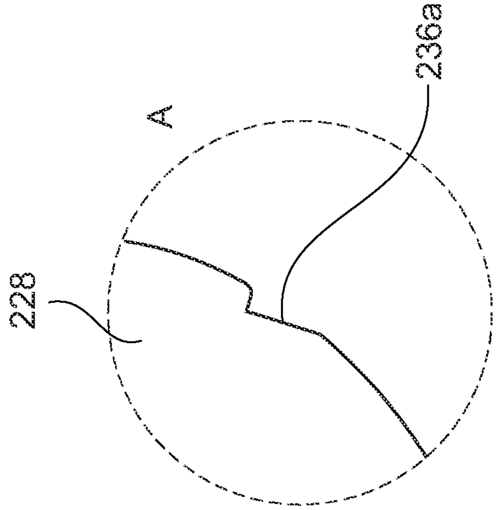
FIG. 8A is an enlarged view of area A in FIG. 8.
Figure 8:
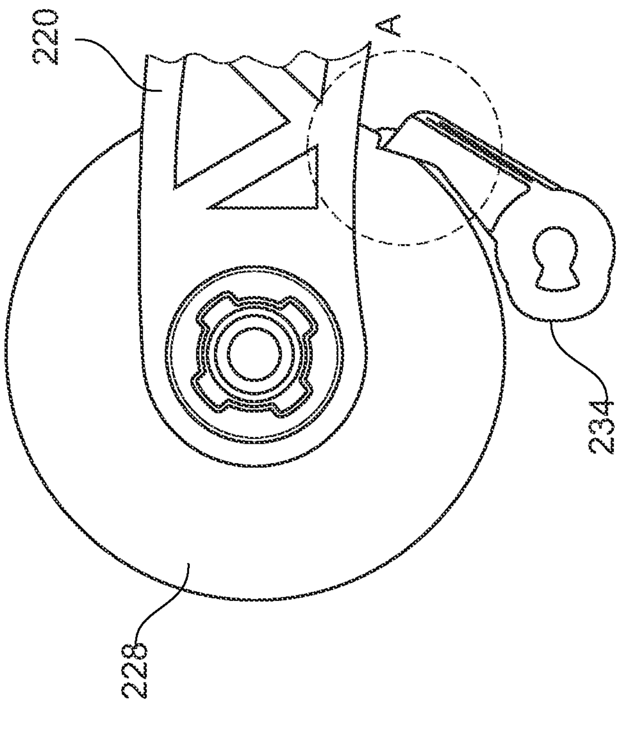
FIG. 8 is an enlarged view of a latch and main shaft of the closure system of FIGS. 4 and 5.

As shown in FIGS. 4 and 5, a closure system 214 may include an automatic locking power movement actuator 232 that is operable to move the flap 216 between the opened and the closed positions relative to the charging port 212 at the side of the vehicle 210 and, when the flap 216 is in the closed position, the power movement actuator 232 automatically locks or secures the flap 216 in the closed position. Thus, when the flap 216 is in the closed position, the automatic locking power movement actuator or automatic locking actuator 232 prevents or precludes the flap 216 from being manually moved from the closed position, without first requiring a locking input from a user. The flap 216 may only be movable from the closed position via actuation of the automatic locking actuator 232. The automatic locking actuator 232 is operable to pivot the hinge arm 220 to move the flap 216 relative to the port 212 and vehicle 210, and the automatic locking actuator 232 drives the driving shaft 230 to rotate the main shaft 228 and pivot the hinge arm 220.

As shown in FIGS. 6-8A, one or more recesses or cutouts or detents 236 are formed along an outer edge or surface of the main shaft 228 and the closure system 214 includes a latch 234 that engages the detent 236 when the flap 216 is in the closed position (FIG. 6) to lock the flap 216 in the closed position. For example, the latch 234 engages a first detent **236*a* when the flap 216 is in the closed position. When the flap 216 is in the open position (FIG. 7), the latch 234 may engage a second detent 236*b* with to hold the flap 216 in the open position. In other words, the latch 234 is fixed relative to the hinge arm 220 and main shaft 228 and as the main shaft 228 and flap 216 pivot from the opened position toward the closed position, the first detent 236*a* of the main shaft 228 moves into engagement with the latch 234. When the latch 234 is engaged with the first detent 236*a*, the main shaft 228 and flap 216 are precluded or restricted from moving from the closed position toward the opened position until the latch 234 is moved out of engagement with the detent 236*a*. The latch 234 may be biased into engagement with the main shaft 228 so that, as the main shaft 228 rotates relative to the latch 234 and the detents 236 respectively align with the latch 234, the latch 234 engages the detent 236 to lock the flap 216. As described further below, the latch 234 is moved out of engagement with the detent 236 to allow the full range of motion of the flap 216 between the closed and opened positions when the automatic locking actuator 232 is electrically operated to pivot the flap 216** from the closed position toward the opened position.

FIGS. 9A-11C depict the automatic locking actuator 232 as the automatic locking actuator 232 is operated from the closed position (FIGS. 9A, 10A, and 11A) where the latch 234 is engaged with the detent 236 of the main shaft 228 to lock the flap 216 in the closed position to an intermediate position (FIGS. 9B, 10B, and 11B) where the latch 234 has been moved out of engagement with the detent 236, and toward the opened position (FIGS. 9C, 10C, and 11C) with the main shaft 228 free to rotate relative to the latch 234. As shown, when the flap 216 is in the closed position and the automatic locking actuator 232 is electrically operated to pivot the flap 216, the automatic locking actuator 232 drives the driving shaft 230 to impart rotation of the main shaft 228. The automatic locking actuator 232 may drive the driving shaft 230 via engagement with a coupling area 231 at the driving shaft 230.

Coupling of the driving shaft 230 to the main shaft 228 is configured to allow for a threshold amount of rotation of the driving shaft 230 relative to the main shaft 228 when the automatic locking actuator 232 is initially operated to move the flap 216 from the closed position toward the opened position. For example, the driving shaft 230 may initially rotate less than 5 degrees, less than 10 degrees, less than 12 degrees, less than 15 degrees, or any suitable threshold rotational amount (torsional backlash), without imparting any rotational movement of the main shaft 228 or flap 216. Rotational movement of the driving shaft 230 beyond the threshold amount (such as a torsional angle of rotation of 12 degrees) rotates the driving shaft 230 and main shaft 228 together and in tandem with one another.

Thus, with the flap 216 in the closed position (FIG. 9A), the automatic locking actuator 232 is operable to, in a first operational stage, rotate the driving shaft 230 a threshold rotational amount **230*a* (e.g., 12 degrees) relative to the main shaft 228. In the illustrated example, the driving shaft 230 includes radial protrusions or teeth 238 that extend from the driving shaft 230 and engage respective channels or grooves 240 at the main shaft 228 or hinge arm. The grooves 240 receive the respective protrusions 238 and the protrusions 238 travel along the grooves 240 as the driving shaft 230 rotates the threshold amount 230*a* relative to the main shaft 228 during the first operational stage. In other words, the threshold amount of rotation 230*a* may be defined by the angle of rotation permitted for the protrusions 238 within the grooves 240, or clearance for the protrusions 238 to move within the grooves 240 before contacting an edge or wall of the main shaft 228 at which point further movement of the driving shaft 230 imparts movement of the main shaft 228 and hinge arm 220**.

Figures 9A, 9B, 9C:
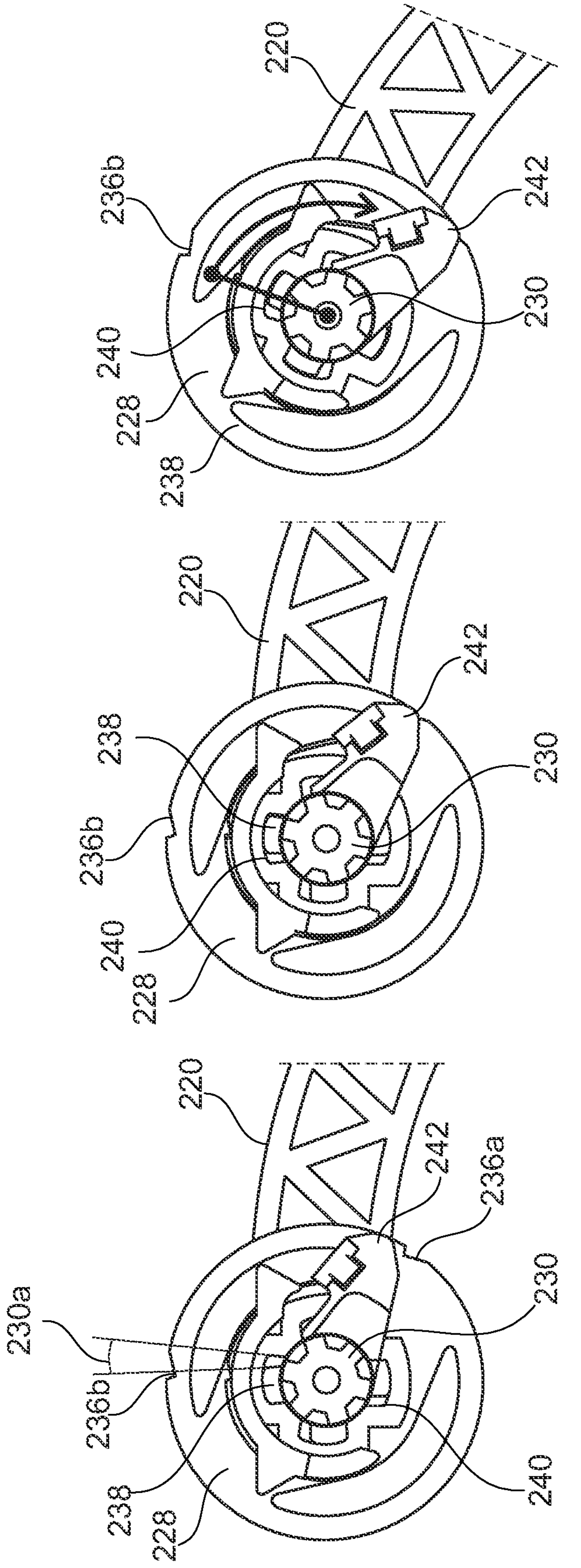

As shown in FIG. 9B, with the protrusions 238 at respective terminal ends of the grooves 240 after the first operational stage, the driving shaft 230 has reached the threshold rotational distance and further driving of the driving shaft 230 by the automatic locking actuator 232 results in rotation of the driving shaft 230 and main shaft 228 to pivot the hinge arm 220 (FIG. 9C). Thus, during a second operational stage following the first operational stage, and with the protrusions 238 contacting the main shaft 228, the automatic locking actuator 232 pivots the flap 216 toward the opened position.

As shown in FIGS. 10A-11C, the threshold rotational movement **230*a* of the driving shaft 230 relative to the main shaft 228 allows a portion of the driving shaft 230 to engage the latch 234 and move the latch 234 out of engagement with the detent 236 of the main shaft 228. Thus, at the end of the first operational stage, the protrusions 238 engage the main shaft 228 and the latch 234 has been moved out of engagement with the first detent 236*a* to free the main shaft 228 for pivotal movement relative to the latch 234**.

That is, responsive to a request to open the flap 216, the actuator will start to rotate the driving shaft. The free play of, for example, 12 degrees between the driving shaft and the main shaft allows the latch to be pushed, and the main shaft remains without movement. After this 12 degree rotation (or other suitable range of rotation), the latch is free, the driving shaft and main shaft are in contact, and the main shaft can turn the hinge arm.

Figure 10C:
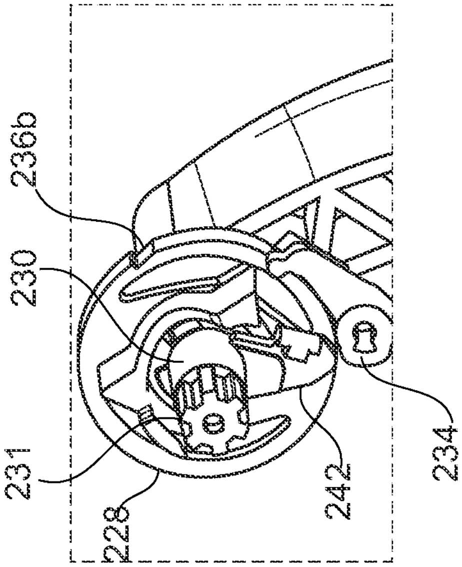
Figure 10B:
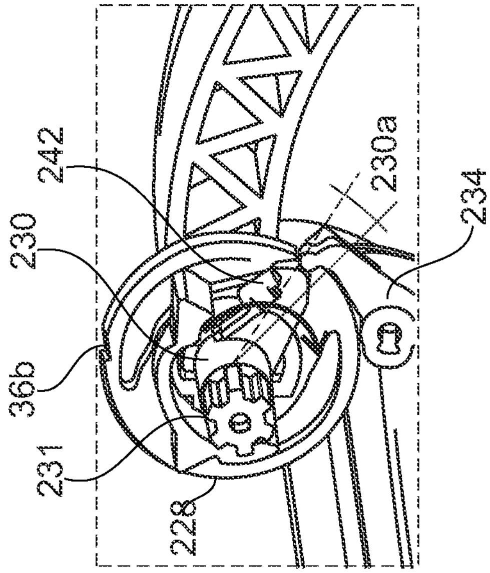
Figure 10A:
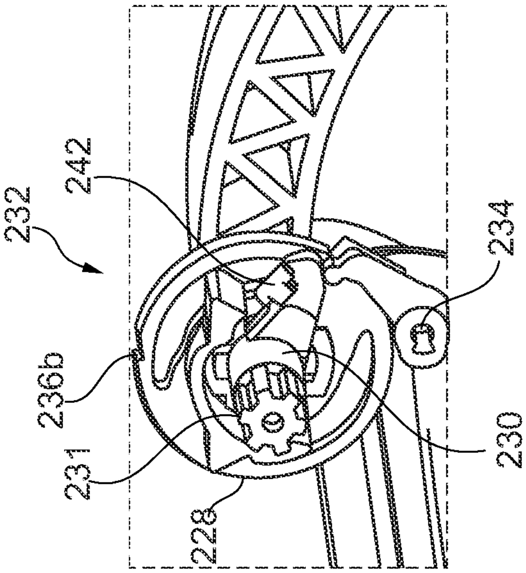
Figure 11C:
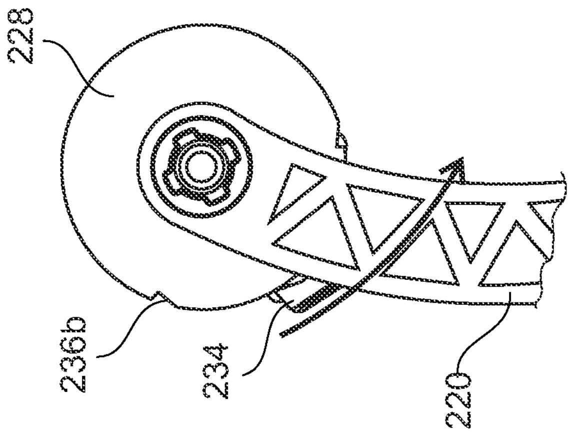
Figure 11B:
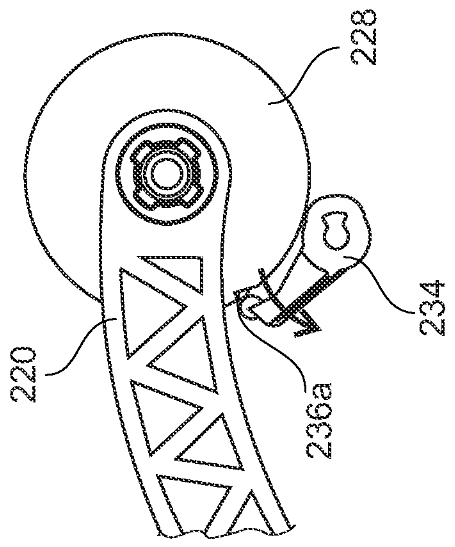
Figure 11A:
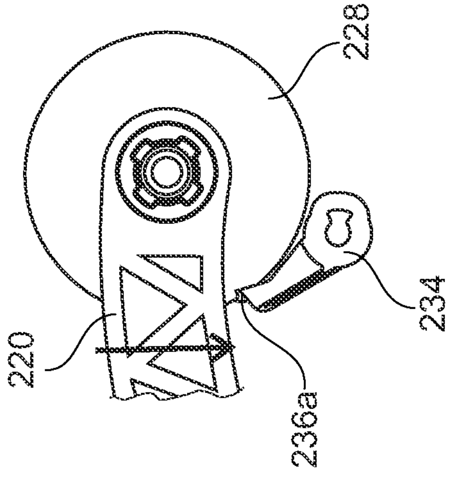

The driving shaft 230 includes a tab or contact arm 242 that is non-rotatably connected or rotationally fixed to the driving shaft 230 and that engages the latch 234. The contact arm 242 includes a rounded end or detent that engages a rounded end or detent of the latch 234 so that, as the driving shaft 230 rotates the threshold amount 230*a* relative to the main shaft 228, the latch 234 travels along the rounded end of the contact arm 242 and the latch 234 is forced or urged out of engagement with the first detent 236*a* (e.g., FIGS. 10A, 11A, 10B, and 11B). As the main shaft 228 and hinge arm 220 move the flap 216 toward the opened position, the latch 234 is biased back into engagement with a smooth portion of an outer surface of the main shaft 228 between detents 236 and the latch 234 travels along the outer perimeter surface of the main shaft 228 (FIGS. 10C, and 11C). As the flap 216 pivots toward the opened position, the latch 234 moves into engagement with the second detent 236*b* to hold or secure the flap 216 at the opened position.

Figure 12A:
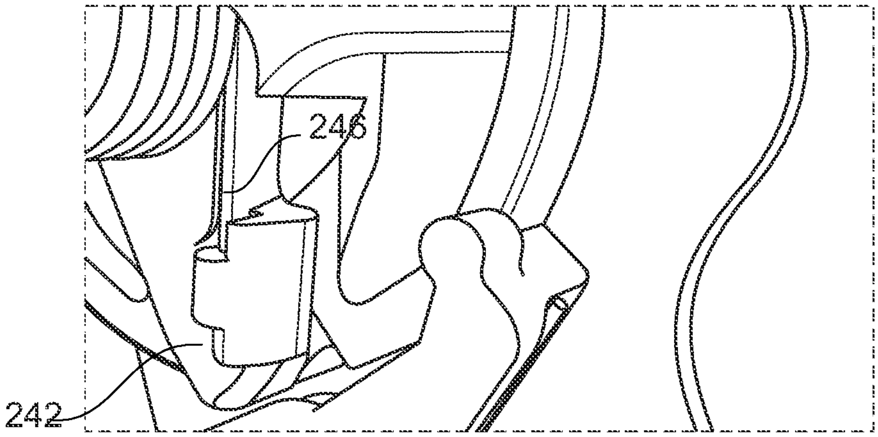
FIGS. 12A-14B are perspective views of the closure system as the fuel port cover panel is moved into the opened position.
Figure 12B:
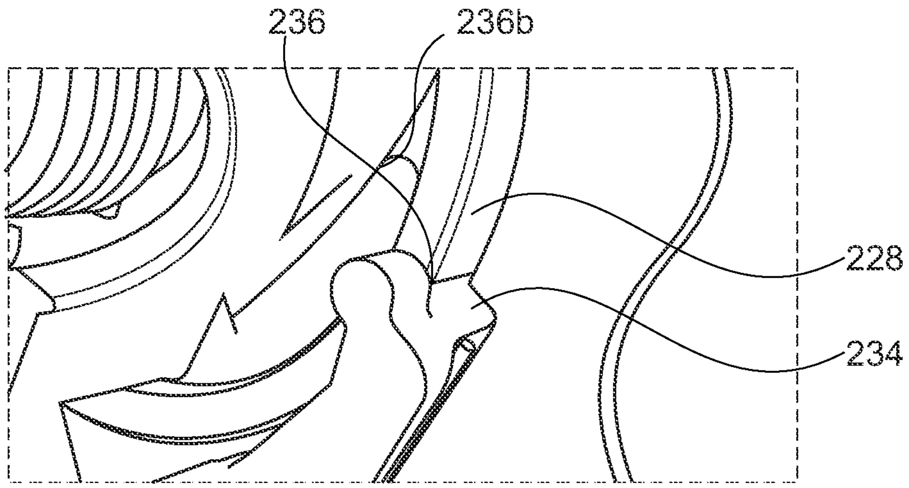
Figure 13A:
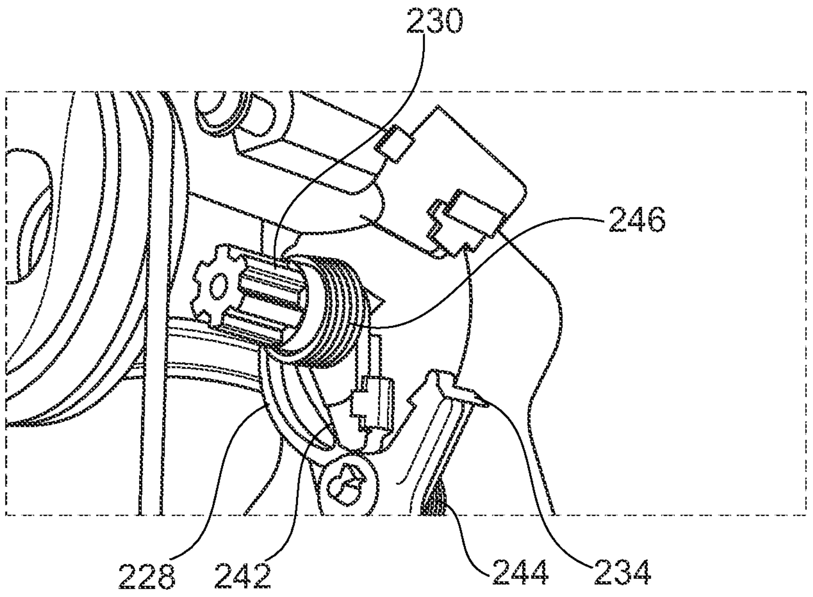
Figure 13B:
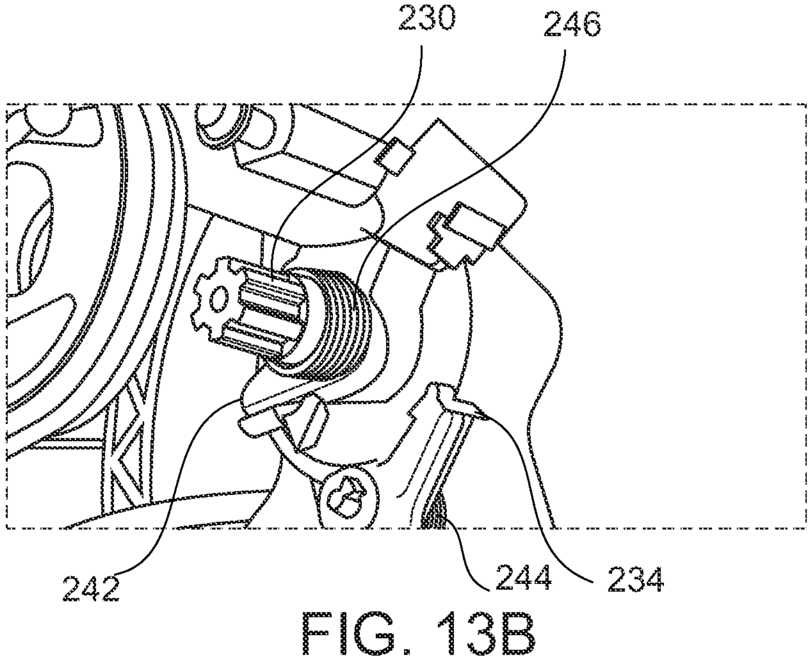
Figure 14A:
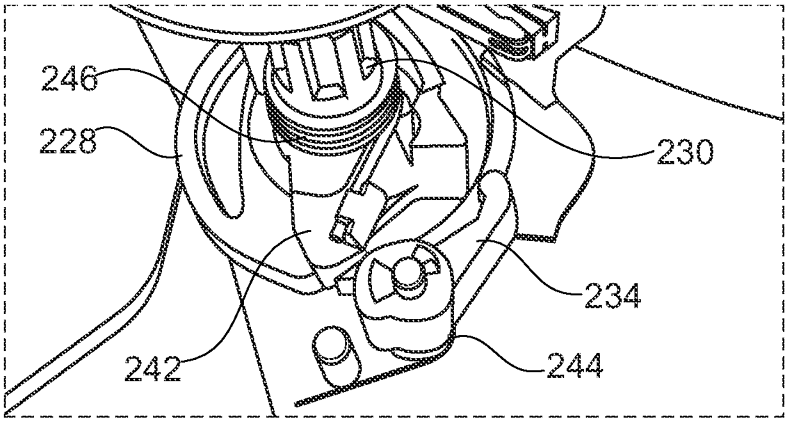
Figure 14B:
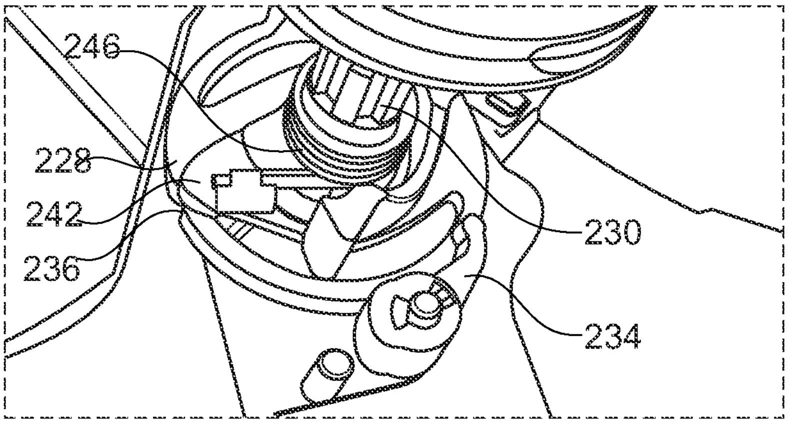

FIGS. 12A-14B depict the automatic locking actuator 232 as it is operated with the latch 234 moved out of engagement with the main shaft 228 and the main shaft 228 free to rotate relative to the latch 234 (FIGS. 12A, 13A, and 14A) and with the flap 216 in the opened position and the latch 234 engaged with the second detent 236*b* to maintain the flap 216 in the opened position (FIGS. 12B, 13B, and 14B). As shown, with the latch 234 moved out of engagement with the detent 236, the automatic locking actuator 232 is operated to rotate the driving shaft 230 and pivot the flap 216 toward the opened position. The main shaft 228 rotates according to rotation of the driving shaft 230 and the latch 234 travels along the outer perimeter surface of the main shaft 228. When the flap 216 reaches the opened position, the second detent 236*b* aligns with the latch 234 and the latch 234 engages the detent 236 to maintain the flap 216 in the opened position. A biasing element, such a torsional spring 244, biases the latch 234 into engagement with the main shaft 228.

The detent interface between the latch 234 and the main shaft 228 is configured so that when a force is applied to move the flap 216 from the opened position toward the closed position, the latch 234 travels along the detent interface and out of engagement with the second detent 236*b* to allow for pivotal movement of the main shaft 228. For example, a user may manually apply a force at the flap 216 to pivot the flap 216 toward the closed position and the main shaft 228 and the driving shaft 230 may rotate to allow the flap 216 to close. As the flap 216 moves from the opened position toward the closed position, the main shaft 228 and the driving shaft 230 rotate in an opposite direction compared to when the flap 216 moves from the closed position toward the opened position.

Furthermore, the automatic locking actuator 232 may be operable to move the flap 216 from the opened position back to the closed position. In the illustrated example, the driving shaft 230 (and therefore the main shaft 228, hinge arm 220, and flap 216) is biased by a biasing member or torsional spring 246 to urge the driving shaft toward the closed position. When the actuator 232 is operated to move the flap 216 from the opened position toward the closed position, the actuator 232 may be operated in an opposite direction compared to when the flap 216 is moved from the closed position toward the opened position. The biasing force provided by the torsional spring 246 may assist the actuator 232 in moving the latch 234 out of engagement with the second detent 236*b* to allow the flap 216 to move toward the closed position.

Thus, the automatic locking actuator 232 is operable to move the flap 216 between the closed and opened positions, with a latch and detent mechanism that locks the flap 216 in the closed position and maintains the flap 216 in the opened position. With the flap 216 in the closed position, the automatic locking actuator 232 may be operated to move the driving shaft 230 a threshold rotational amount 230*a* in a first direction (e.g., clockwise in FIGS. 10A-10C) relative to the main shaft 228 so that a contact arm 242 non-rotatably connected or rotationally fixed to the driving shaft 230 moves the latch 234 out of engagement with the first detent 236*a* of the main shaft 228, thus unlocking the closure system 214. With the closure system 214 unlocked, the automatic locking actuator 232 further drives the driving shaft 230 to rotate the driving shaft 230 and main shaft 228 together and in tandem further in the first direction to pivot the flap 216 from the closed position to the opened position. As the main shaft 228 rotates in the first direction, the latch 234 travels along the outer edge of the main shaft 228 and engages the second detent 236*b* with the flap 216 in the opened position. This stops pivotal movement of the flap 216 and maintains the flap 216 in the opened position. From the opened position, subsequent operation of the automatic locking actuator 232 in an opposite, second direction (e.g., counterclockwise in FIGS. 13A and 13B) or a manual force at the flap 216 rotates the main shaft 228 in the opposite, second direction and moves the latch 234 out of engagement with the second detent 236*b* to allow for closure of the flap 216. For example, the flap 216 may be biased toward the closed position by the biasing element 246 at the driving shaft 230.

Figure 15:
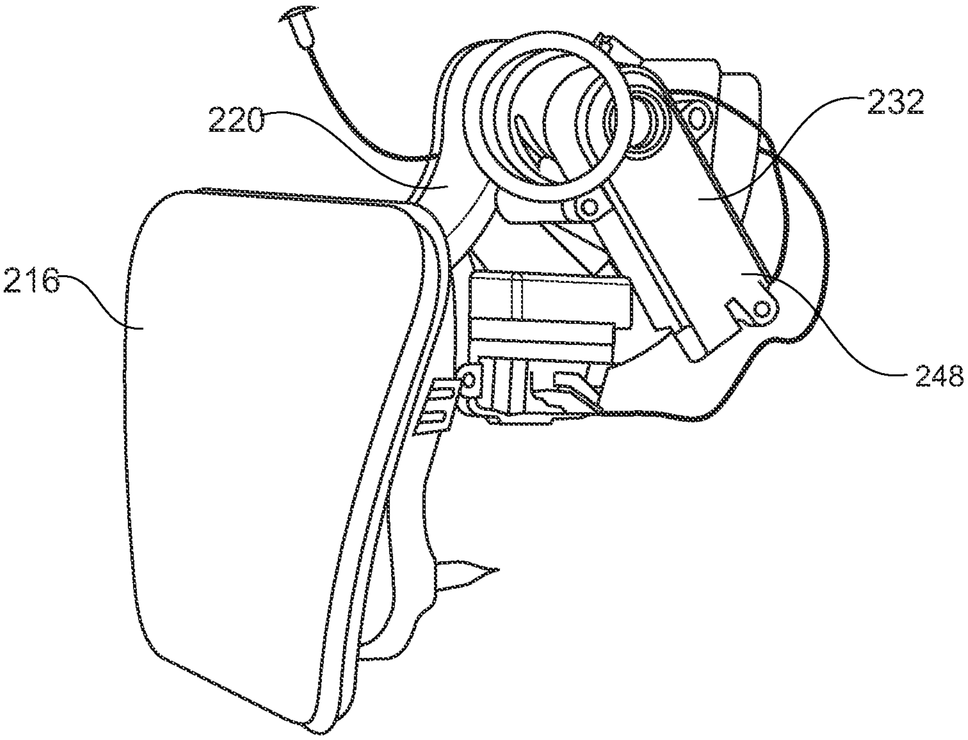
FIG. 15 is a perspective view of the closure system.

Optionally, the main shaft 228 and the hinge arm 220 may be fixedly attached to or integrally formed with one another, such that the main shaft 228 and hinge arm 220 move together and in tandem when driven by the driving shaft 230 and the automatic locking actuator 232. In reference to FIG. 15, the main shaft 228 and the hinge arm 220 may be considered as one part (i.e., fit together when assembled) and may be disposed (with the automatic locking actuator 232) into a housing 248.

Thus, the auto-locking actuator eliminates the need for separate power movement and locking actuators, and requires only a single actuator to provide power movement and locking functionality to the closure system. This solution will automatically lock the main shaft when the flap is closed. A latch of the auto-locking actuator locks the main shaft and hinge arm in position. Advantages of the closure system including only one actuator include a cost improvement and better offer to the customer, such as savings on bill of materials costs, assembly, and maintenance. Furthermore, there are fewer assembly issues when mounting on the vehicle.

The charge ports described herein may be illuminated via any suitable means, and may utilize aspects of the charge ports and systems described in U.S. Pat. No. 8,317,376 and/or U.S. Publication No. US 2023/0191926, which are hereby incorporated herein by reference in their entireties. The vehicle may include various indicators to indicate the charge level of the vehicle, such as by utilizing aspects of the systems described in U.S. Pat. No. 10,746,575 and/or U.S. Publication No. US 2021/0129757, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular closure system, the vehicular closure system comprising:

a cover panel configured to mount at or near a charge or fuel port of a vehicle equipped with the vehicular closure system;

wherein, with the cover panel mounted at the vehicle, the cover panel is movable between (i) a closed position, where the cover panel conceals the charge or fuel port of the vehicle, and (ii) an opened position, where the cover panel is moved away from the vehicle to allow access to the charge or fuel port;

a deployment mechanism coupled to the cover panel and electrically operable to move the cover panel between the closed position and the opened position;

wherein, when the cover panel is in the closed position, a detent interface of the deployment mechanism is engaged to preclude the cover panel from being manually moved from the closed position;

wherein, when the cover panel is in the closed position, and responsive to operation of the deployment mechanism to move the cover panel from the closed position toward the opened position, the detent interface is moved out of engagement to allow for movement of the cover panel from the closed position toward the opened position;

wherein, when the cover panel is in the closed position, and with the detent interface moved out of engagement, operation of the deployment mechanism moves the cover panel from the closed position toward the opened position; and wherein, when the cover panel is in the opened position, the detent interface is engaged to maintain the cover panel in the opened position.

2. The vehicular closure system of claim 1, wherein, when the cover panel is in the opened position, and responsive to manual movement of the cover panel from the opened position toward the closed position, the detent interface is moved out of engagement to allow for movement of the cover panel from the opened position toward the closed position.

3. The vehicular closure system of claim 1, wherein, when the cover panel is in the opened position, and responsive to operation of the deployment mechanism to move the cover panel from the opened position toward the closed position, the detent interface is moved out of engagement to allow for movement of the cover panel from the opened position toward the closed position.

4. The vehicular closure system of claim 1, comprising (i) a base portion configured to mount at or near the charge or fuel port of the vehicle, and (ii) a pivot arm pivotably attached to the base portion, wherein the cover panel is disposed at the pivot arm, and wherein the pivot arm is pivotable relative to the base portion to move the cover panel between the closed position and the opened position.

5. The vehicular closure system of claim 4, wherein the deployment mechanism comprises an electrically operable actuator that is electrically operable to rotate a drive shaft, and wherein rotation of the drive shaft imparts pivotal movement of the pivot arm to move the cover panel between the closed position and the opened position.

6. The vehicular closure system of claim 5, wherein a main shaft is rotationally fixed relative to the pivot arm, and wherein rotation of the drive shaft imparts rotation of the main shaft to impart pivotal movement of the pivot arm.

7. The vehicular closure system of claim 6, wherein, when the cover panel is in the closed position, a latch of the deployment mechanism engages the main shaft to preclude the cover panel from being manually moved from the closed position.

8. The vehicular closure system of claim 7, wherein the main shaft comprises a detent at a position along a circumferential region of the main shaft, and wherein the latch engages the main shaft at the detent.

9. The vehicular closure system of claim 8, wherein, with the cover panel in the closed position, the actuator is electrically operable to rotate the drive shaft relative to the main shaft, and wherein, with the cover panel in the closed position, rotation of the drive shaft relative to the main shaft moves the latch out of engagement with the main shaft to allow for movement of the cover panel from the closed position toward the opened position.

10. The vehicular closure system of claim 9, wherein, with the latch moved out of engagement with the main shaft, the actuator is electrically operable to rotate the drive shaft together and in tandem with the main shaft, and wherein rotation of the drive shaft together and in tandem with the main shaft moves the cover panel from the closed position toward the opened position.

11. The vehicular closure system of claim 9, wherein the drive shaft is rotatable relative to the main shaft up to a threshold rotational amount.

12. The vehicular closure system of claim 9, wherein the drive shaft comprises a contact arm rotationally fixed relative to the drive shaft, and wherein, during rotation of the drive shaft relative to the main shaft, the contact arm engages the latch to move the latch out of engagement with the main shaft.

13. The vehicular closure system of claim 7, wherein, when the cover panel is in the opened position, the latch engages the main shaft to maintain the cover panel at the opened position.

14. The vehicular closure system of claim 1, wherein the charge or fuel port is configured to receive a nozzle that delivers fuel to a fuel tank of the vehicle.

15. The vehicular closure system of claim 1, wherein the charge or fuel port comprises an electrical charging socket of the vehicle.

16. A vehicular closure system, the vehicular closure system comprising:

a base portion configured to mount at or near a charge or fuel port of a vehicle equipped with the vehicular closure system;

a pivot arm pivotably attached to the base portion;

a cover panel disposed at the pivot arm, wherein, with the base portion mounted at the vehicle, the pivot arm is pivotable relative to the base portion to move the cover panel between (i) a closed position, where the cover panel conceals the charge or fuel port of the vehicle, and (ii) an opened position, where the cover panel is moved away from the vehicle to allow access to the charge or fuel port;

a deployment mechanism coupled to the pivot arm and electrically operable to impart pivotal movement of the pivot arm to move the cover panel between the closed position and the opened position;

wherein, when the cover panel is in the closed position, a detent interface of the deployment mechanism is engaged to preclude the cover panel from being manually moved from the closed position;

wherein, when the cover panel is in the opened position, the detent interface is engaged to maintain the cover panel in the opened position;

wherein, when the cover panel is in the closed position, and responsive to operation of the deployment mechanism to move the cover panel from the closed position toward the opened position, the detent interface is moved out of engagement to allow for movement of the cover panel from the closed position toward the opened position; and wherein, when the cover panel is in the closed position, and with the detent interface moved out of engagement, operation of the deployment mechanism moves the cover panel from the closed position toward the opened position.

17. The vehicular closure system of claim 16, wherein the deployment mechanism comprises an electrically operable actuator that is electrically operable to rotate a drive shaft, and wherein rotation of the drive shaft imparts pivotal movement of the pivot arm to move the cover panel between the closed position and the opened position.

18. The vehicular closure system of claim 17, wherein a main shaft is rotationally fixed relative to the pivot arm, and wherein rotation of the drive shaft imparts rotation of the main shaft to impart pivotal movement of the pivot arm.

19. The vehicular closure system of claim 18, wherein, when the cover panel is in the closed position, a latch of the deployment mechanism engages the main shaft to preclude the cover panel from being manually moved from the closed position.

20. The vehicular closure system of claim 19, wherein the main shaft comprises a detent at a position along a circumferential region of the main shaft, and wherein the latch engages the main shaft at the detent.

21. The vehicular closure system of claim 20, wherein, with the cover panel in the closed position, the actuator is electrically operable to rotate the drive shaft relative to the main shaft, and wherein, with the cover panel in the closed position, rotation of the drive shaft relative to the main shaft moves the latch out of engagement with the main shaft to allow for movement of the cover panel from the closed position toward the opened position.

22. The vehicular closure system of claim 21, wherein, with the latch moved out of engagement with the main shaft, the actuator is electrically operable to rotate the drive shaft together and in tandem with the main shaft, and wherein rotation of the drive shaft together and in tandem with the main shaft moves the cover panel from the closed position toward the opened position.

23. A vehicular closure system, the vehicular closure system comprising:

a cover panel configured to mount at or near a charge port of a vehicle equipped with the vehicular closure system, wherein the charge port comprises an electrical charging socket of the vehicle;

wherein, with the cover panel mounted at the vehicle, the cover panel is movable between (i) a closed position, where the cover panel conceals the charge port of the vehicle, and (ii) an opened position, where the cover panel is moved away from the vehicle to allow access to the charge port;

a deployment mechanism coupled to the cover panel and electrically operable to move the cover panel between the closed position and the opened position;

wherein the deployment mechanism comprises an electrically operable actuator that is electrically operable to rotate a drive shaft, and wherein rotation of the drive shaft imparts movement of the cover panel between the closed position and the opened position;

wherein a main shaft is rotationally fixed relative to the cover panel, and wherein rotation of the drive shaft imparts rotation of the main shaft to impart movement of the cover panel between the closed position and the opened position;

wherein, when the cover panel is in the closed position, a detent interface of the deployment mechanism is engaged to preclude the cover panel from being manually moved from the closed position;

wherein, with the cover panel in the closed position, the actuator is electrically operable to rotate the drive shaft relative to the main shaft;

wherein, when the cover panel is in the closed position, and responsive to operation of the deployment mechanism to move the cover panel from the closed position toward the opened position, the actuator is electrically operated and rotation of the drive shaft relative to the main shaft moves the detent interface out of engagement to allow for movement of the cover panel from the closed position toward the opened position;

wherein, when the cover panel is in the closed position, and with the detent interface moved out of engagement, operation of the deployment mechanism moves the cover panel from the closed position toward the opened position; and wherein, when the cover panel is in the opened position, the detent interface is engaged to maintain the cover panel in the opened position.

24. The vehicular closure system of claim 23, comprising (i) a base portion configured to mount at or near the charge port of the vehicle, and (ii) a pivot arm pivotably attached to the base portion, wherein the cover panel is disposed at the pivot arm, and wherein the pivot arm is pivotable relative to the base portion to move the cover panel between the closed position and the opened position.

25. The vehicular closure system of claim 24, wherein rotation of the drive shaft imparts pivotal movement of the pivot arm to move the cover panel between the closed position and the opened position.

26. The vehicular closure system of claim 23, wherein, when the cover panel is in the closed position, a latch of the deployment mechanism engages the main shaft to preclude the cover panel from being manually moved from the closed position.

27. The vehicular closure system of claim 26, wherein the main shaft comprises a detent at a position along a circumferential region of the main shaft, and wherein the latch engages the main shaft at the detent.

28. The vehicular closure system of claim 26, wherein, with the cover panel in the closed position, rotation of the drive shaft relative to the main shaft moves the latch out of engagement with the main shaft to allow for movement of the cover panel from the closed position toward the opened position.

29. The vehicular closure system of claim 28, wherein, with the latch moved out of engagement with the main shaft, the actuator is electrically operable to rotate the drive shaft together and in tandem with the main shaft, and wherein rotation of the drive shaft together and in tandem with the main shaft moves the cover panel from the closed position toward the opened position.

30. The vehicular closure system of claim 23, wherein the drive shaft is rotatable relative to the main shaft up to a threshold rotational amount.

* * * * *